United States Patent [19]

Kuo

[11] Patent Number: 5,108,291

[45] Date of Patent: Apr. 28, 1992

[54] SUPPLEMENTARY TEACHING INSTRUMENTS

[76] Inventor: Chun-Hsiung Kuo, No. 8, Alley 15, Lane 121, Pei Hsin Rd., Section 2, Hsin Tien CIty, Taipei Hsien, Taiwan

[21] Appl. No.: 578,955

[22] Filed: Sep. 7, 1990

[51] Int. Cl.⁵ ............................................. G09B 23/02
[52] U.S. Cl. .................... 434/211; 273/157 R; 434/208
[58] Field of Search ............... 434/188, 195, 196, 207, 434/211, 208; 273/267, 276, 283, 284, 156, 157

[56] References Cited

U.S. PATENT DOCUMENTS

| | | | |
|---|---|---|---|
| 356,167 | 1/1887 | Shannon | 434/196 |
| 1,165,980 | 12/1915 | Kurtz | 273/157 R |
| 1,941,558 | 1/1934 | Labbe | 273/157 R |
| 2,738,594 | 3/1956 | Swingle | 273/157 R |
| 3,423,849 | 1/1969 | Jordan et al. | 434/188 |
| 3,667,760 | 6/1972 | Nelson | 434/211 |
| 4,645,461 | 2/1987 | Mortensen | 434/211 |

Primary Examiner—Richard J. Apley
Assistant Examiner—Karen Richard
Attorney, Agent, or Firm—Ladas & Parry

[57] ABSTRACT

A supplementary teaching instrument based on mathematical basic theories and principles as well as child psychology. The invention employs a number of rectangular blocks of a prescribed shape which occupy a predetermined area when assembled together, and a corresponding area of triangular shaped blocks of various sizes and shapes. In addition to creating artistic designs by different arrangements of the blocks which may be of different colors, the rectangular blocks can be used in the fashion of a domino game, and the dimensional relationship between the triangular blocks and the rectangular blocks teach the basic concepts of mathematics including addition, substraction, multiplication, fractions, areas, and the like.

3 Claims, 13 Drawing Sheets

SUPPLEMENTARY TEACHING INSTRUMENTS

BACKGROUND OF THE INVENTION

1. Field of the Invention

This invention relates to the field of education and in particular to a teaching instrument with which students can play games, create artistic designs, and learn mathematical relationships.

2. Brief Summary of the Prior Art

The general education of children today relies upon compulsory standard curriculum education without enjoyable enlightening effects. As a consequence, the intelligence development of children has been frustrated due to the unconscious resistance to studying, and this has thus led to difficulties in expanding the scope of studies effectively. This standard approach to teaching has also caused great psychological encumbrances to the learning process of children such that their fears are aroused easily to greatly affect their intelligence development. It not only aggravates knowledge dispelling attitudes of the children, but also leads to the loss of freshness and attractiveness in such studies. In particular, the subject of mathematics represents the most significant problem with children, since mathematics itself is a science of active or dynamic understandings. Although compulsory standard curriculum education is designed to prepare the student for examinations, this type of teaching may only obtain temporary satisfaction in the results thereof, and the children may be left in an unrealized state of education and unable to promote the interests of knowledge acquisition effectively. Eventually, the ability to have independent thoughts and creation potential will be lost.

SUMMARY OF THE INVENTION

The present invention is intended to be accommodated within the mathematics curriculum for children and to effectively cultivate the interest of children to study. In an attempt to overcome the many technical problems and difficulties in the principles of mathematics, the present invention is designed for teaching purposes, for artistic creation in what may be referred to as collage games, for playing domino games, and to enable the study of mathematics during such games. The invention is also intended to train students in their organizing and expressing ability and to inspire their thinking and creating potential. Under such circumstances, the games may be utilized to eliminate the fears of the children to study and to arouse their interests for additional knowledge.

Hence, the primary objective of the invention is to provide a kind of supplementary teaching instrument structure to provide a basic understanding in the fundamental mathematical principles in the form of games using square panels and by means of simple and precise structural elements to further enable the children to study mathematics from the games. In addition, the fears of academic theories may be alleviated from the children through the cheerful atmosphere created, and thus the interest in acquiring knowledge may be cultivated to enable the children to achieve the teaching objective by gaining knowledge from the curriculums through the games and discussion activities involving the invention.

Another objective of the invention is to provide various shaped objects with simple components by the utilization of triangular blocks and rectangular blocks which may be assembled in various ways for teaching purposes. Hence, the organizing and expressing ability of the children may be trained, and the potential of independent thought and creativity may be inspired and enlightened.

Another objective of the invention is to utilize the artistic composition aspect and domino game aspect of the invention to not only teach effective basic mathematical principles, but also to provide special educational programs for talented, mentally deficient children, or children with learning disabilities. Apart from the teaching activities experienced by the children in the form of drawings and designing, color matching, and paintings, simple games suitable for the younger children and the aged may also be undertaken to promote a narrowing of the generation gap.

According to the invention, a set of square panels with surrounding frames is used. Inside one of the panels is a set of triangular shaped blocks of various shapes and sizes such as right angles and triangles of four sizes having a relationship with another set of blocks comprised of 32 rectangular pieces, each having a width of $\frac{1}{8}$ the length of the square panel and a length equal to $\frac{1}{4}$ the length of the square panel, the blocks permitting a variety of diagrammatic variation effects in the playing of collage games and domino games. The relationship between the blocks also provides a basis for understanding basic concepts of mathematics.

DESCRIPTION OF THE PREFERRED EMBODIMENT

Figure 1:
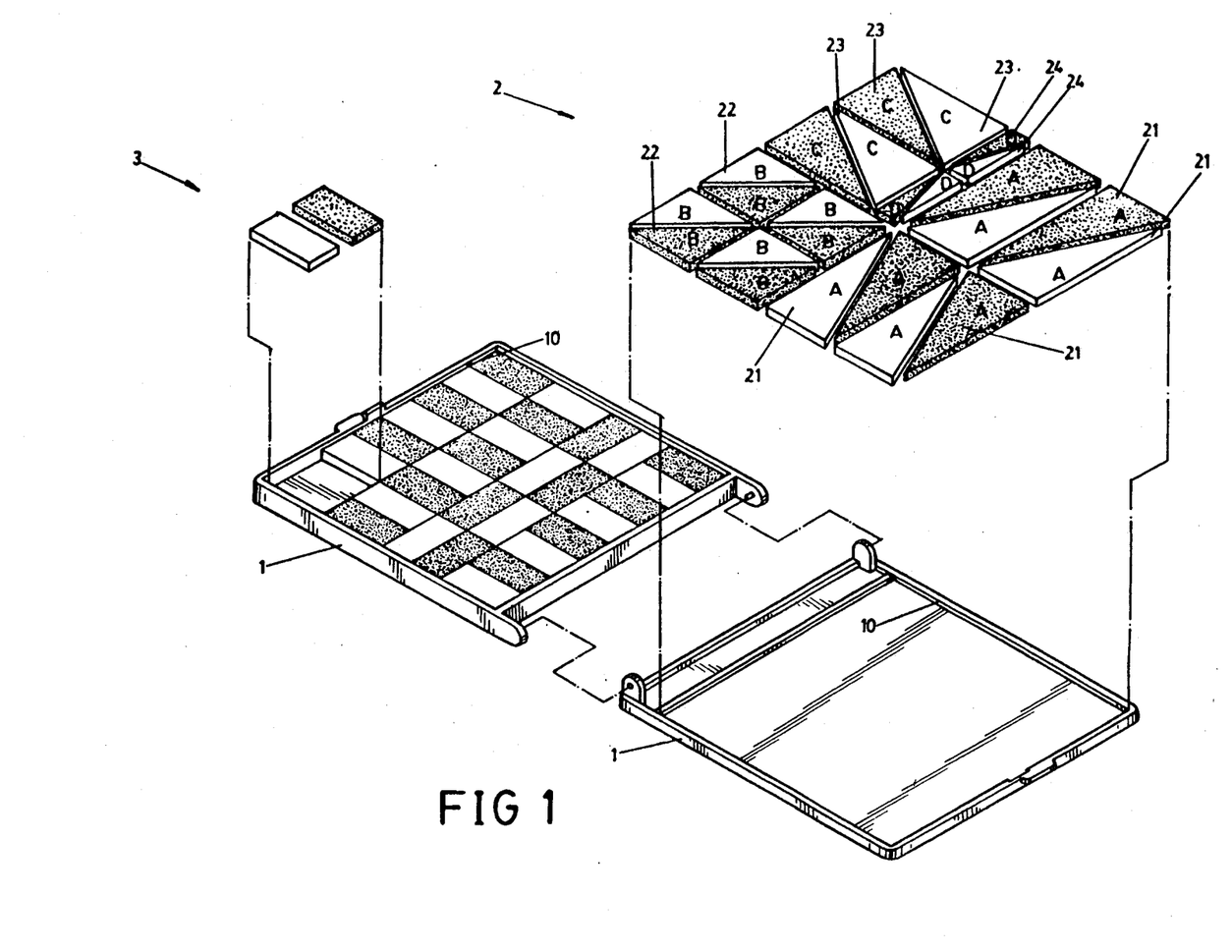
FIGS. 1 & 2 are simplified pictorial drawings of the invention, with FIG. 1 showing an exploded view of the various parts thereof.
Figure 2:
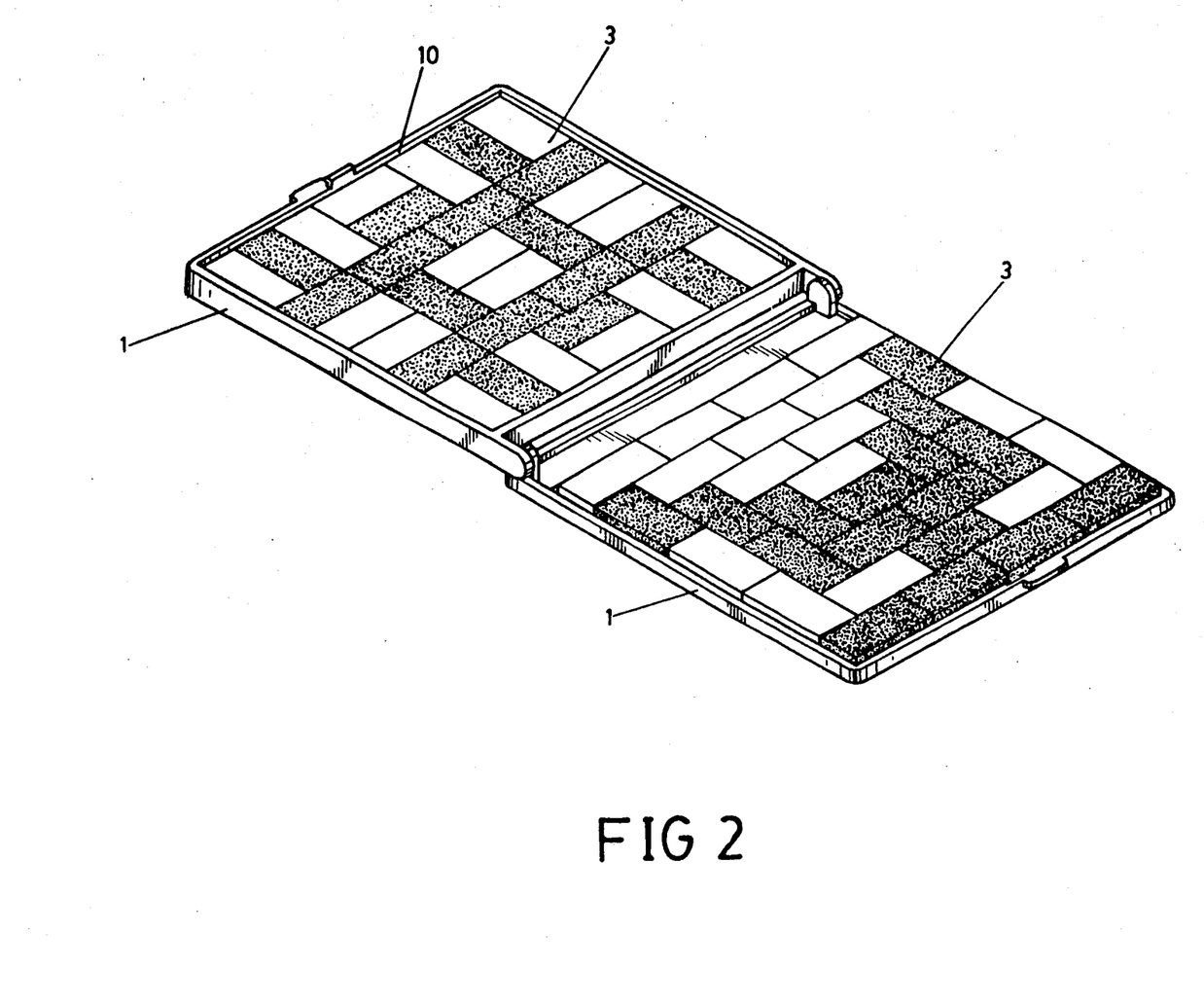
Figure 3:
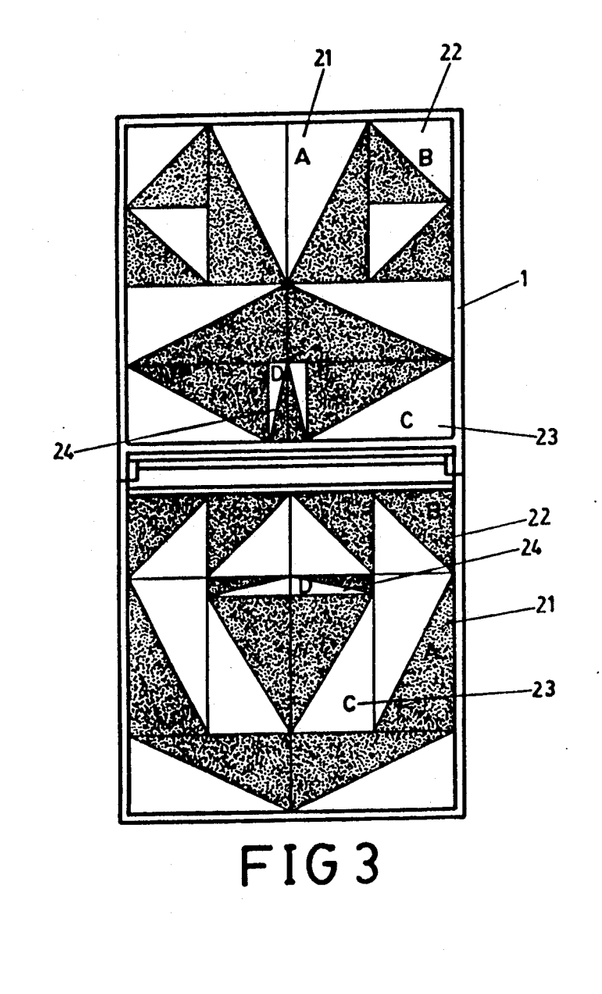
FIGS. 3-12 show variations of various designs illustrations or diagrammatic drawings, i.e. showing the results of the application of artistic collage game playing.
Figure 4:
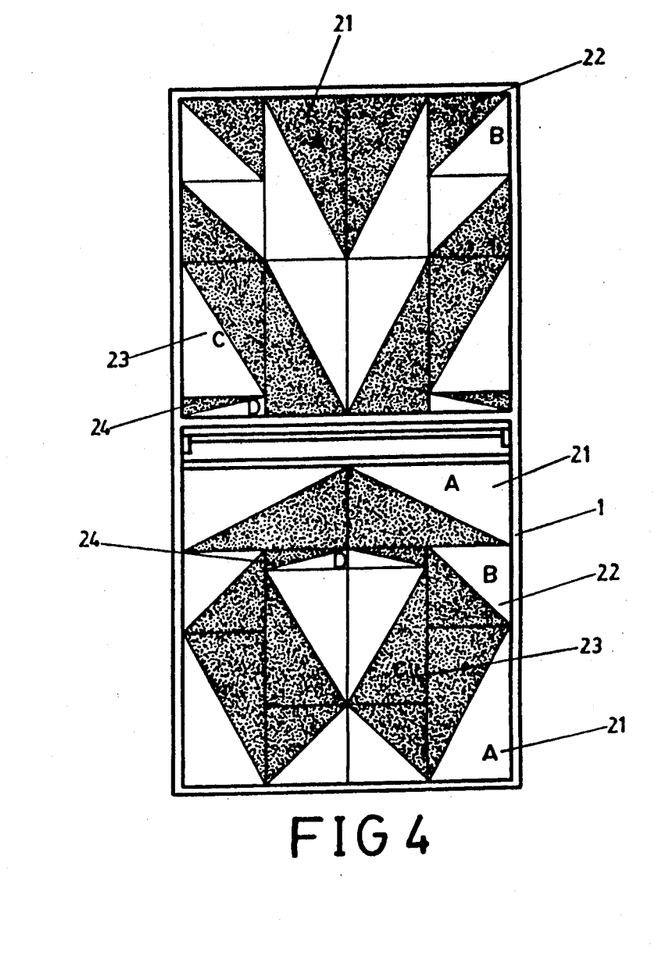
Figure 5:
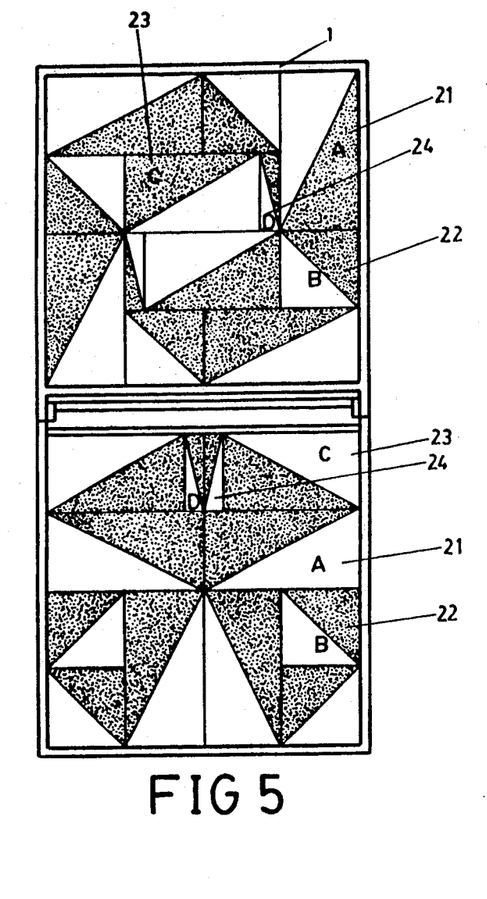
Figure 6:
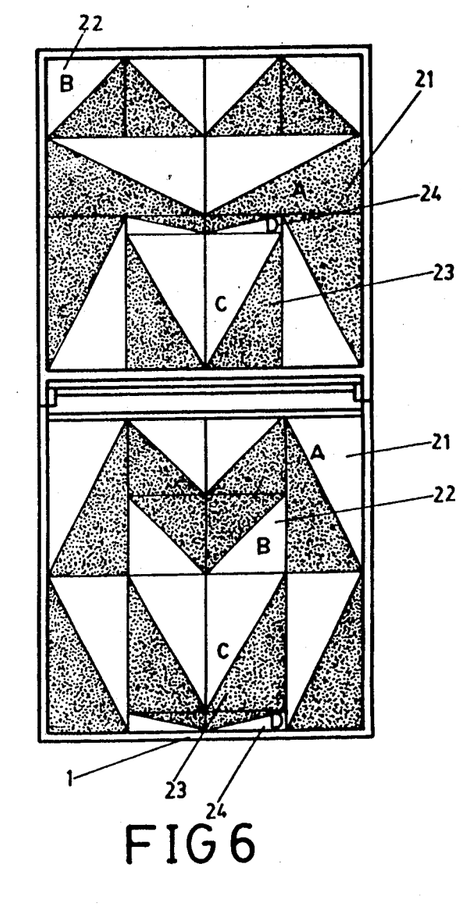
Figure 7:
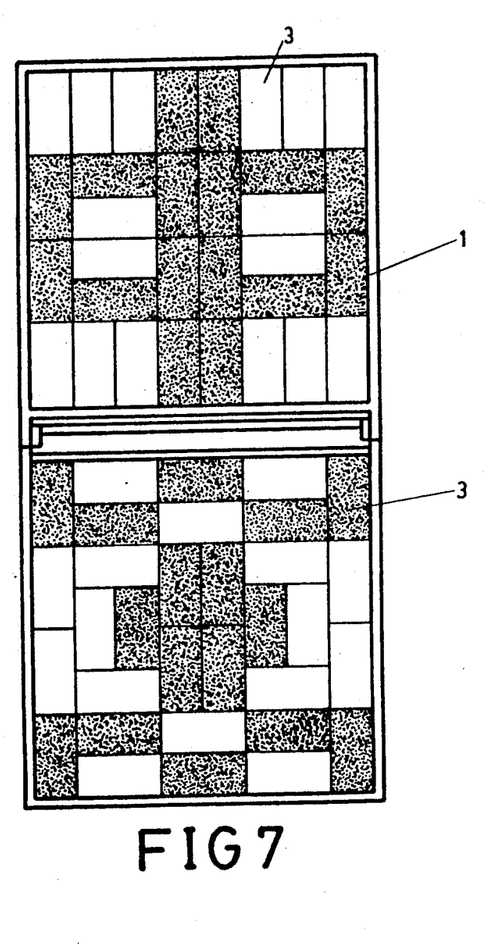
Figure 8:
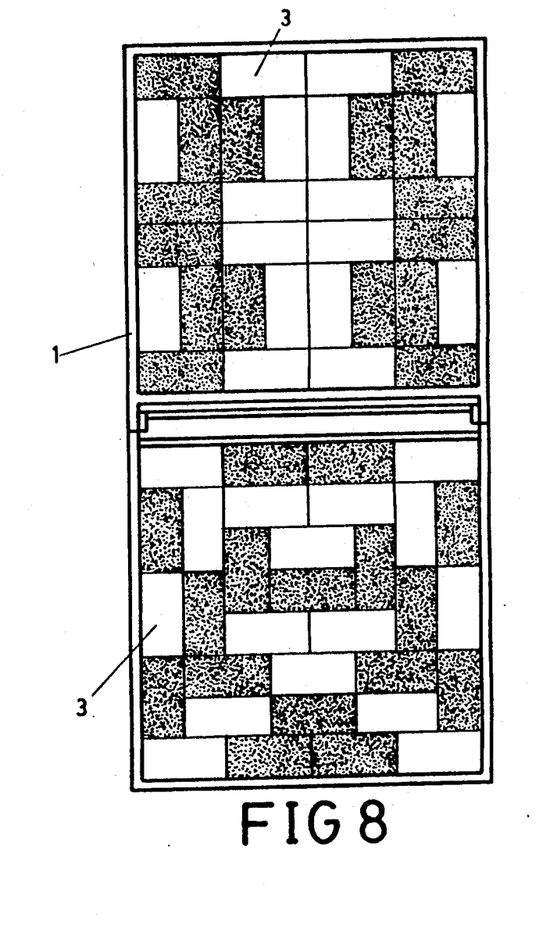
Figure 9:
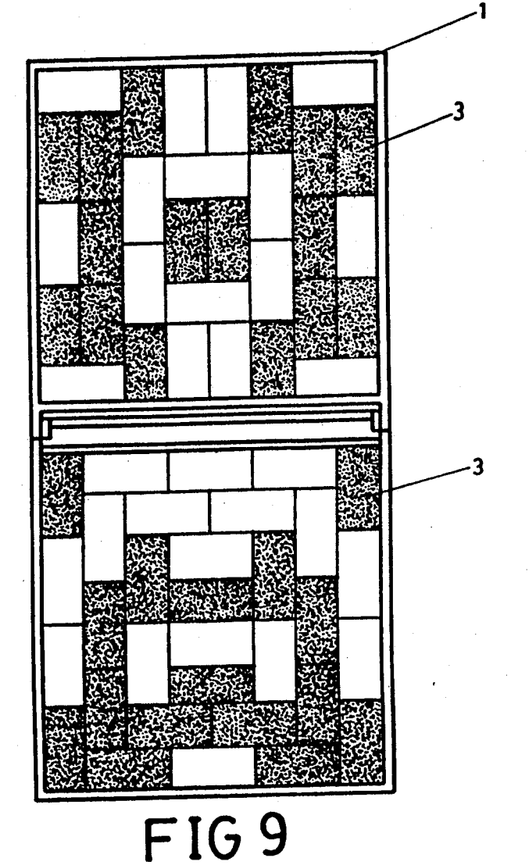
Figure 10:
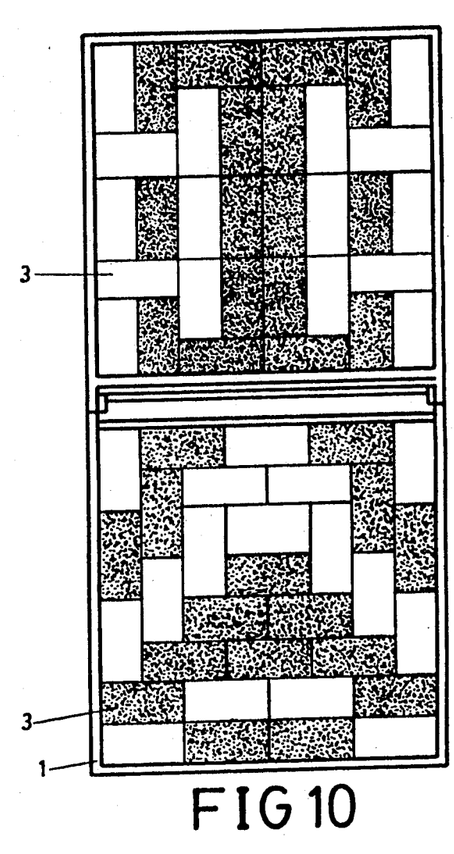
Figure 11:
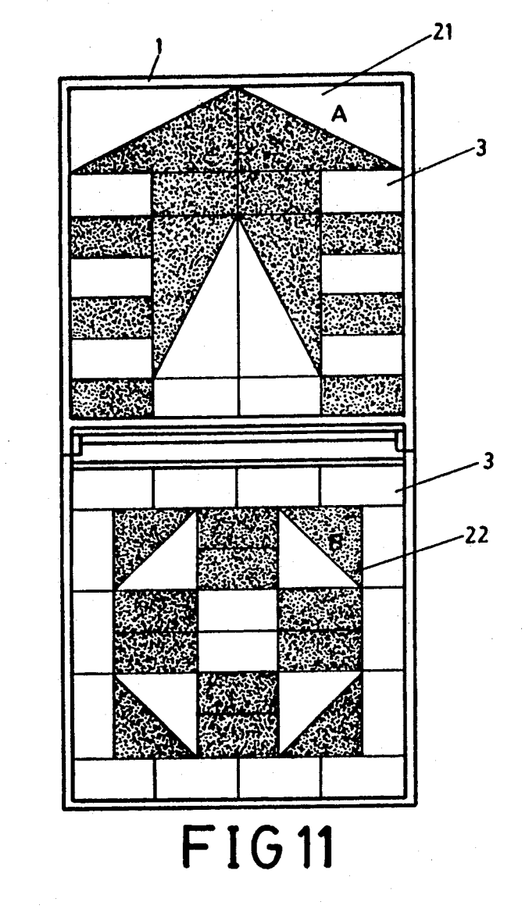
Figure 12:
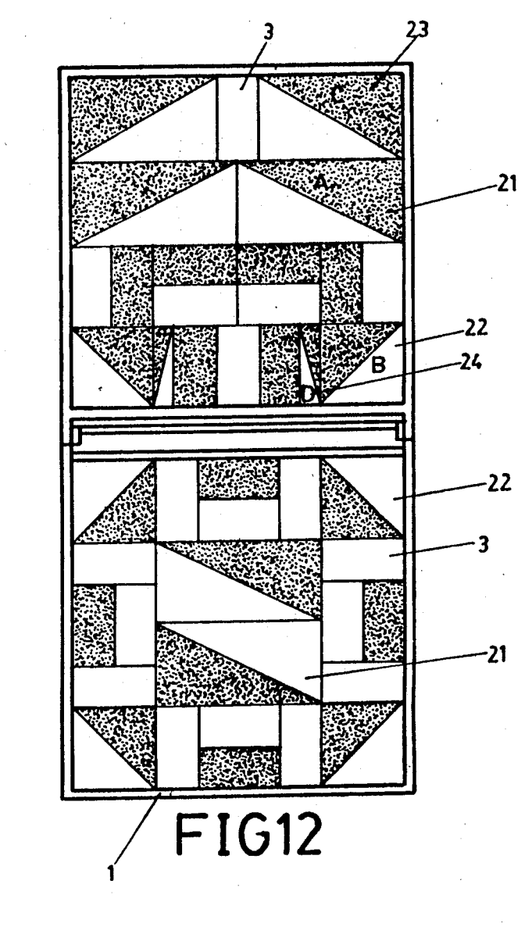

The supplementary teaching instrument of this invention is based on the psychology of child study development theory and satisfies the needs of the children in this respect by providing a teaching instrument using various blocks in the form of triangles and quadrilaterals. As indicated in FIGS. 1 & 2, a set of triangular blocks 2 of four different sizes and having various shapes, such as right angles, are provided inside a square panel 1 with surrounding frame 10. In a matching panel, a set of 32 rectangular blocks 3, all of the same size and shape, have their short side equal to $\frac{1}{8}$ of the side length of square panel 1 and their length equal to $\frac{1}{4}$ of the length of one side of square panel 1.

The design of the triangular blocks 2 is based on dividing the square panel 1 in to four equal square partitions. Two of the partitions are divided into halves and then each half is cut along a corresponding diagonal to thereby form eight right-angled triangle blocks 21 identified in FIG. 1 as blocks A. A third partition is cut in to eight isosceles triangle blocks 22 along corresponding diagonals after the partition itself is divided into four equal squares, the result being eight blocks of isosceles triangle shape shown in FIG. 1 as blocks B. The remaining fourth partition of the square panel 1 is divided in to four right-angled triangles 23 identified in FIG. 1 as blocks C, any two of which can be assembled to form an equilateral triangle. Finally, the four smaller right-angle triangles 24, identified in FIG. 1 as blocks D are sized to fit the remaining area of the fourth partition.

Half of the triangular shape blocks A, B, C, and D and half of the rectangular blocks 3 are of one color, and the other half are of another color.

The positions of the blocks may be changed and altered into various diagrammatic drawings or artistic designs with composite effects based on the aligned assembly relationship of the triangular blocks 2 and the rectangular blocks in the square panel 1. That is, there is a relationship in the dimensions of the triangular blocks 2 and the rectangular blocks 3, and from FIG. 1 the following relationships are apparent: for blocks A, one side has a length equal to ¼ the length of one side of the square panel, (or twice the length of the short side of a rectangular block 3) while another side has a dimension of twice that amount. As to blocks B, the equal sides of the isosceles triangle blocks 22 have a length equal to ¼ the length of one side of the square panel 1 (or twice the length of the short side of a rectangular bock 3). In the fourth partition, the relatively large triangular blocks C each have one side equal in length to ½ the length of a side of the partition which is ¼ the length of one side of the squre panel 1 (or twice the length of the short side of a rectangular block 3) such that any two of the triangle blocks C, when juxtaposed, form an equilateral triangle shape. The smaller triangular blocks D have one side equal in length to one half the length of a side of the partition which is ¼ the length of one side of the square panel 1 (or twice the length of the short side of a rectangular block 3) such that any two of blocks D, when juxtaposed, form an isosceles triangle shape.

FIGS. 3–12 show the results of drawing (by block placement) composition games wherein various designs are indicated. Consequently, at least one side of each triangular block has a length equal to a multiple of the length of the short side of a rectangular block 3.

Figure 13:
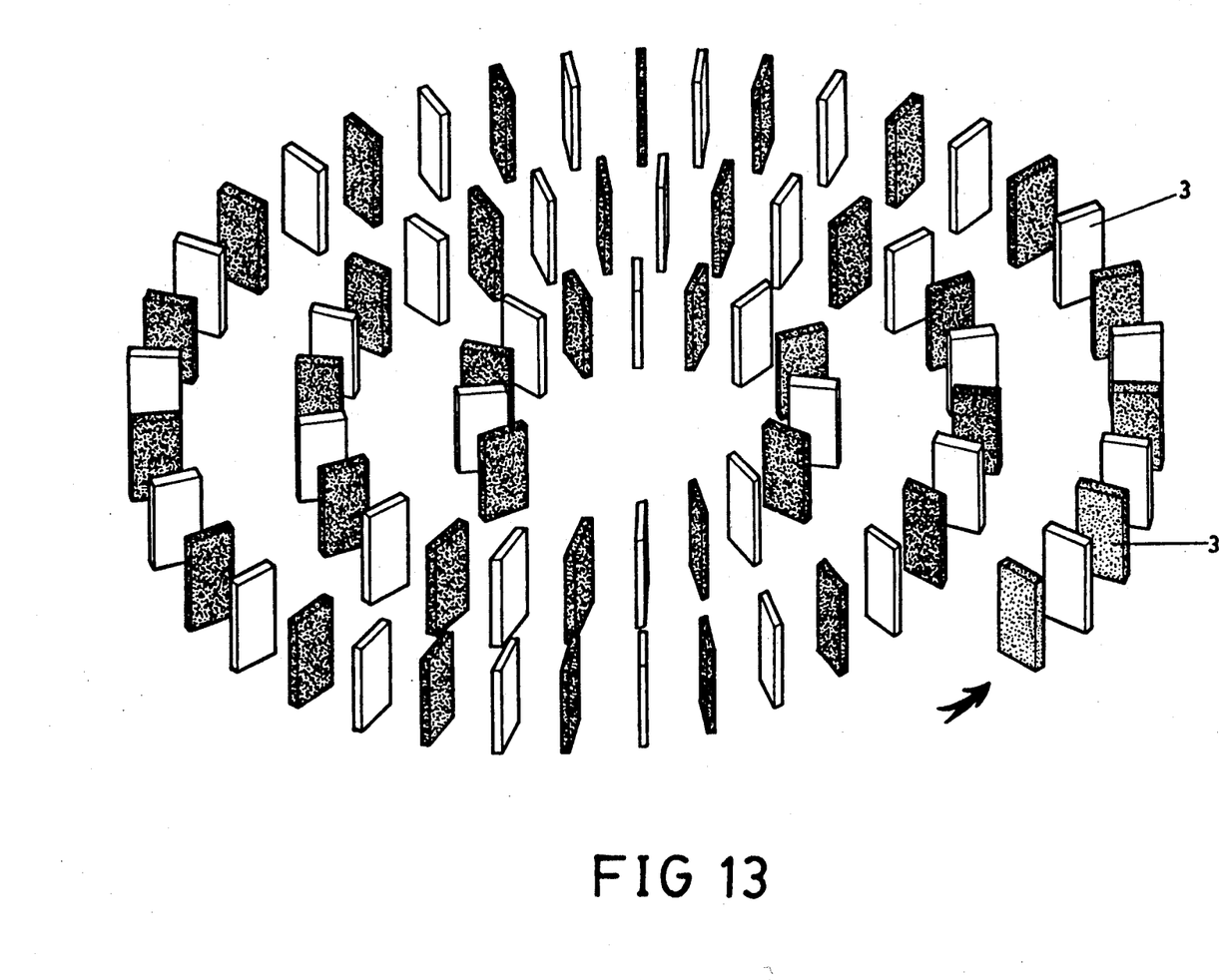
FIG. 13 shows the rectangular blocks (from multiple sets) arranged in the fashion of a domino game.

In FIG. 13, the rectangular blocks 3 are shown standing on their ends to create a domino effect game. Since the rectangular blocks 3 are matched from one game set to another, if more than 32 dominos are desired, a number of game sets can be employed to create a long string of dominos as indicated in FIG. 13.

When the invention is used in the teaching of mathematical principles, the following concepts are learned: the concept of integers, the four basic calculations of addition, substraction, multiplication, and division, factor multiplying, the concept of fractions including the continued fraction, reduction fraction, and general fraction, the identification and classification of triangles of various categories and of quadrilaterals, as well as the origins and applications of area calculation formulas.

Figure 14:
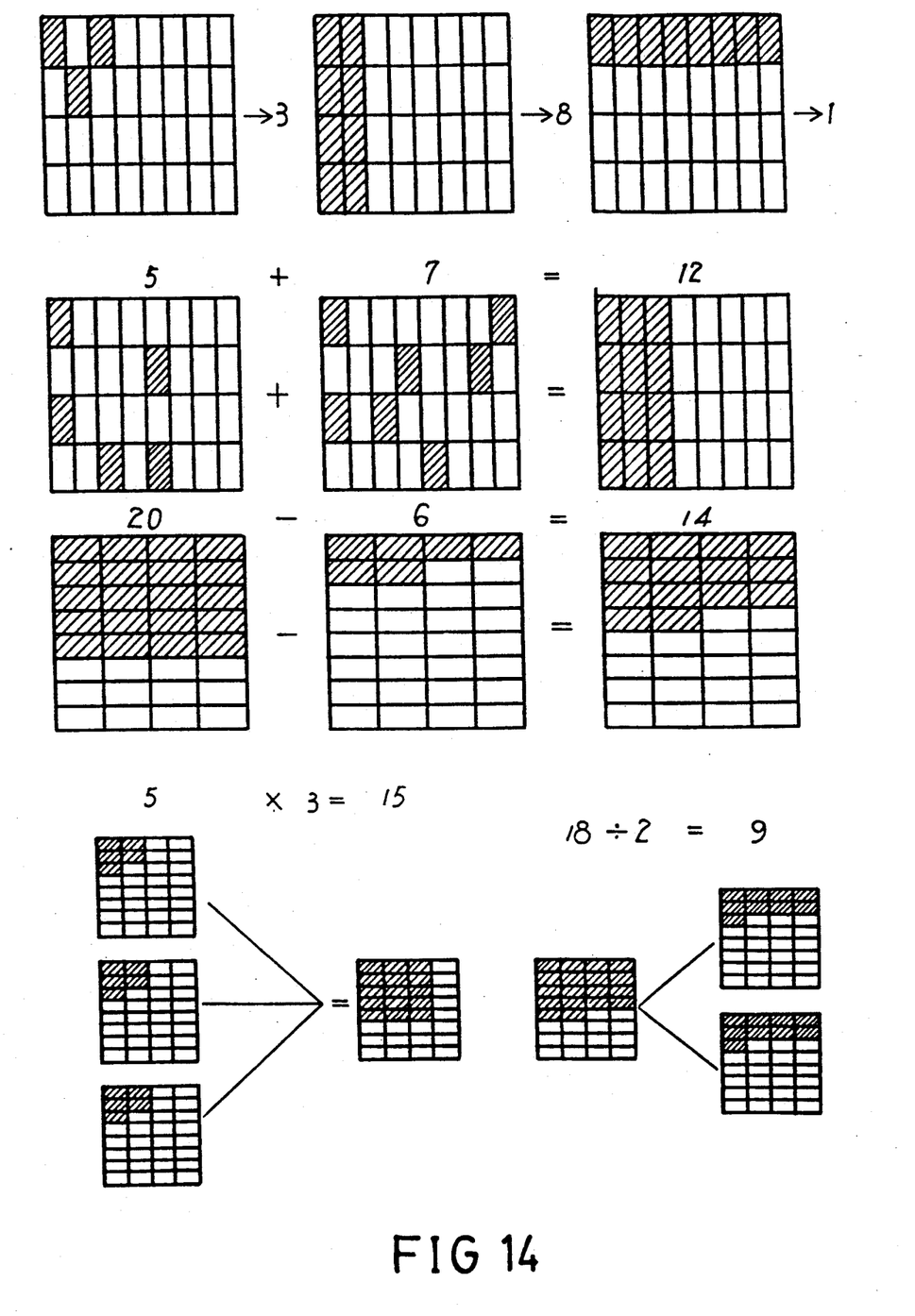
FIGS. 14-18 illustrate various arrangements of the blocks to teach elements of the mathematical curriculum.

The teaching instrument of the present invention is both simplified and easily understood. For example, the rectangular blocks 3 in the square panel 1 of the invention may be equally divided into colored and uncolored portions, and the square panel 1 divided in to 32 rectangular blocks, meaning that each square panel 1 consists of 16 colored and 16 uncolored rectangular blocks 3. Each rectangular block may be independently placed as an entity or combined into a unit of several such blocks for enabling the children to study the basic concepts of mathematics such as the concept of integers, the principles of addition, substraction, multiplication, division (FIG. 14), and the calculation of factors and multipliers (FIGS. 15 and 16).

Figure 15:
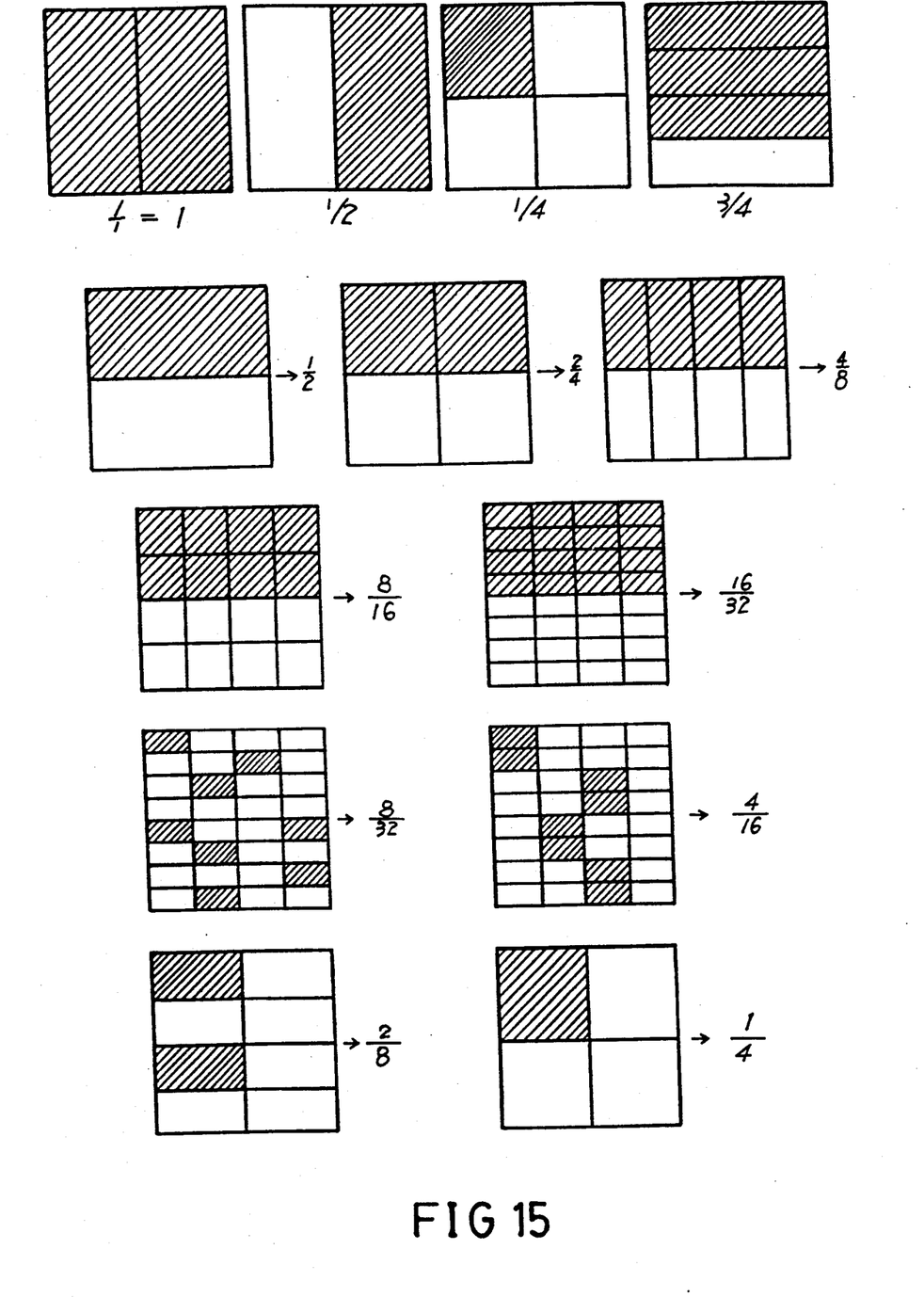
Figure 16:
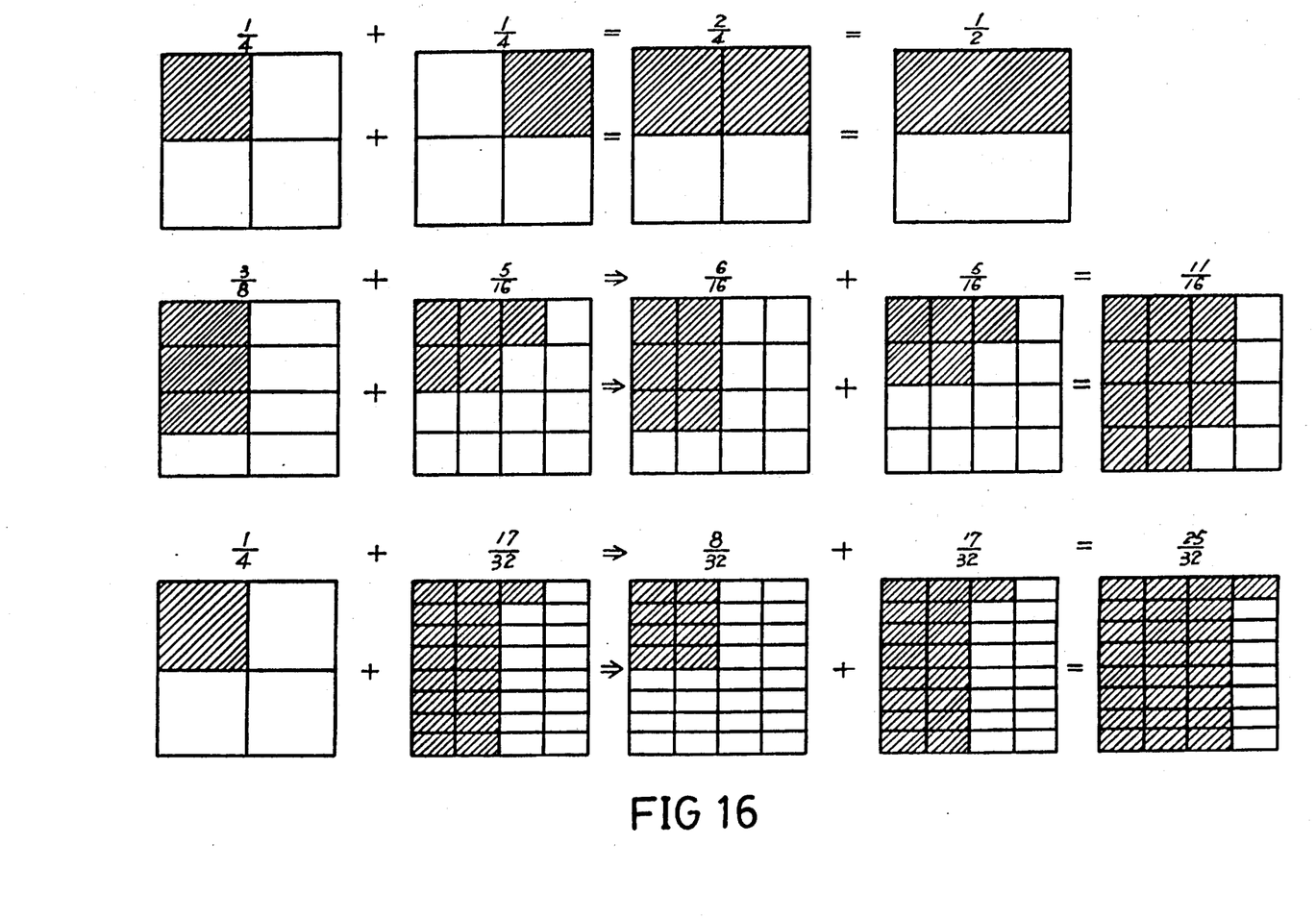

As indicated in FIG. 15, the relationship of the numerators and denominators of fractions may be indicated with the colored and uncolored portions of the rectangular blocks 3 to facilitate the studies of these factors. Problems involving continued factors, reduction factors, and general factors may be solved by employing the rectangular blocks 3 in combination or decomposition, as indicated in FIGS. 15 and 16.

The relationship between triangles and quadrilaterals must be dimensionally matched for a proper understanding of the mathematical concepts, and this is possible by means of the dimensional relationship between triangular blocks 2 and rectangular blocks 3 according to the invention.

Using the invention, problems can be solved with the most simple, convenient, rapid, and correct method through the utilization of the shifting of various simplified diagrammatic positions, or figure solving principles by using imaginary lines to mark off different groups of blocks, and in time the student will be able to experience self-learning and attain problem solving ability on his or her own.

Figure 17:
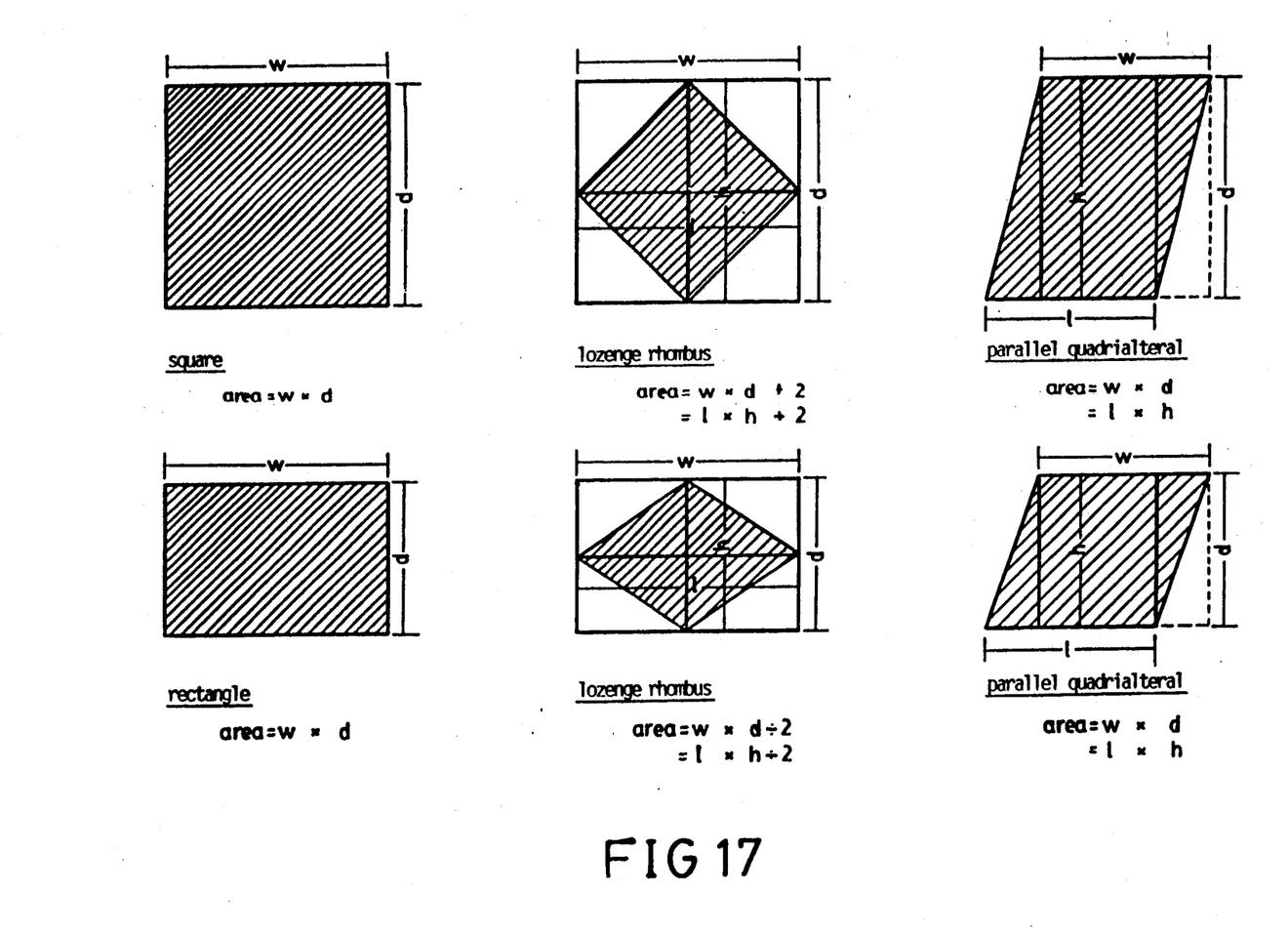
Figure 18:
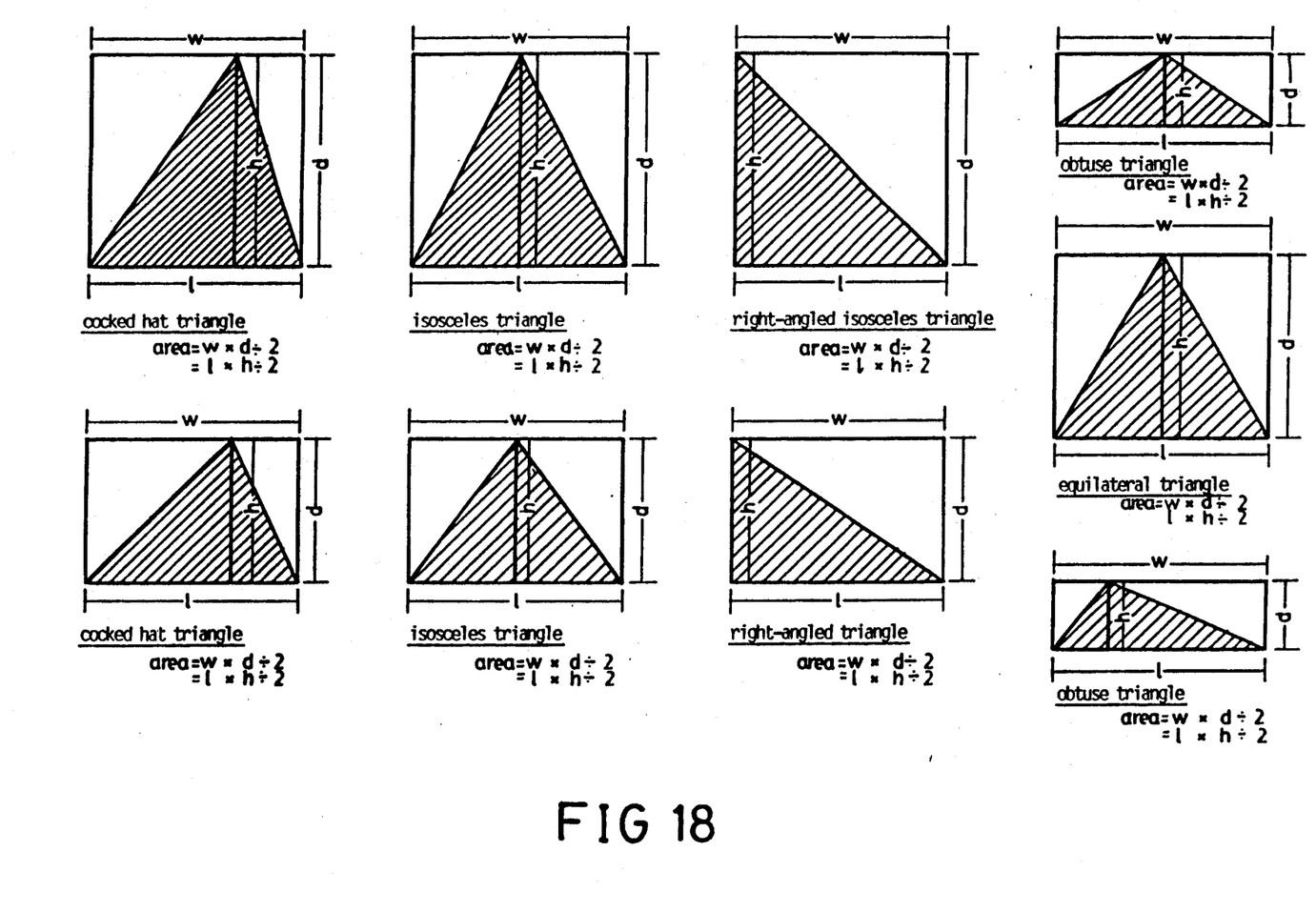

As indicated in FIGS. 17 and 18, employing the invention will explain why the areas of the squares, rectangles, and parallel quadrilaterals are the product of length times width, and the area of a lozenge rhombus is the length times width divided by two, and the areas of various triangles such as the cocked hat triangles, obtuse triangles, isosceles triangles, and right-angled triangles, etc. are the product of the base length and the height divided by two. It will also be apparent that the areas surrounding certain of the shapes (rhombus and triang'.es) may also be calculated from the length times height divided by two relationship. Such problems and the understanding of their theories may be established by the triangular blocks 2 of this invention in the form of a simple proof and solution. For instance, 8 pieces of blocks A (21) or blocks B (22) may be arranged into a rectangle or a square, respectively, and its interior portion may be comprised of colored blocks in the shape of a lozenge rhombus or parallel quadrilateral. Additionally, imaginary lines surrounding a group of triangular shaped blocks 2 can be employed, and the area relationship between the group of blocks and the rectangular blocks 3 permit the calculation process to be easily reasoned out. This is similar to the principle of area acquisition where various triangle blocks can be grouped together or separated to visually observe the principles involved.

Thus, children may be enabled to acquire knowledge of the conditional characteristics, features, or relationships of the various diagrammatic drawings easily and clearly through the studying process of observation, analysis, comparison, judgment, analogy, and deduction. In this manner, scientific methods for learning may be cultivated.

Apart from the games and fun effects, the structure of the invention promotes progressive mathematics teaching from simple to sophisticated teaching to establish a deepened and broadened understanding of the principles involved. The invention has great utilization value to the education of children.

I claim:

1. A teaching instrument comprising:

a first square panel containing thirty-two rectangular blocks, the short side of each rectangular block having a length equal to one-eighth the length of a side of said square panel, the long side of each rectangular block having a length equal to one-fourth the length of a side of said square panel; and a second square panel, the ame size as said first square panel, containing twenty-four triangular blocks, at least one side of each said triangular block having a length equal to a multiple of the length of said short side of said rectangular blocks.

2. The teaching instrument as claimed in claim 1, wherein:

said second square panel is divided into equal first, second, third, and fourth square partitions;

said first and second partitions each comprising four equal sized right triangular shaped blocks with one side of each said right triangular shaped block equalling the length of a side of said square partitions and another side of each said right triangular shaped blocks equalling one-half the length of a side of said square partitions;

said third partition comprsies eight equal sized isosceles triangular shaped blocks each having two sides with each side equalling one-half the length of a side of said square partitions; and said fourth partition comprises four relatively small triangular shaped blocks each having one side equal in length to one-half the length of a side of said square partition, and four relatively large triangular shaped blocks each having one side equal in length to one-half the length of a side of said square partition such that any two of said relatively large triangular shaped blocks when juxtaposed form an equilateral triangle shape, and such that any two of said relatively small triangular shaped blocks when juxtaposed form an isosceles triangular shape.

3. The teaching instrument as claimed in claim 1, wherein:

half of said rectangular blocks are of a first color, and the other half are of a second color; and half of said triangular blocks of each shape are of said first color, and the other half are of said second color.

* * * * *